US008072379B2

(12) United States Patent
Gopinath

(10) Patent No.: US 8,072,379 B2
(45) Date of Patent: Dec. 6, 2011

(54) GPS POWER SAVINGS USING LOW POWER SENSORS

(75) Inventor: Sunil Gopinath, Campbell, CA (US)

(73) Assignee: QUALCOMM Incorporated, San Diego, CA (US)

( * ) Notice: Subject to any disclaimer, the term of this patent is extended or adjusted under 35 U.S.C. 154(b) by 348 days.

(21) Appl. No.: 12/119,246

(22) Filed: May 12, 2008

(65) Prior Publication Data

US 2009/0278738 A1 Nov. 12, 2009

(51) Int. Cl.
*G01S 19/34* (2010.01)
*G01S 19/49* (2010.01)

(52) U.S. Cl. ............................. 342/357.74; 342/357.32

(58) Field of Classification Search ............. 342/357.14, 342/357.74, 357.39
See application file for complete search history.

(56) References Cited

U.S. PATENT DOCUMENTS

| 5,075,693 | A | 12/1991 | McMillan et al. |
| 5,592,173 | A | 1/1997 | Lau et al. |
| 5,862,511 | A | 1/1999 | Croyle et al. |
| 5,991,692 | A | 11/1999 | Spencer, II et al. |
| 6,029,111 | A | 2/2000 | Croyle |
| 6,125,325 | A | 9/2000 | Kohli |
| 6,774,838 | B2 | 8/2004 | Sun |
| 7,308,272 | B1 * | 12/2007 | Wortham ................. 342/357.74 |
| 7,359,713 | B1 * | 4/2008 | Tiwari ...................... 342/357.74 |
| 7,409,219 | B2 | 8/2008 | Levitan |
| 7,425,918 | B2 * | 9/2008 | Rastegar et al. ............. 342/173 |
| 2004/0169244 | A1 * | 9/2004 | MacGugan .................. 257/416 |
| 2005/0275587 | A1 * | 12/2005 | Siegel et al. ............. 342/357.06 |
| 2007/0224951 | A1 | 9/2007 | Gilb et al. |
| 2008/0012759 | A1 | 1/2008 | Te-Yi |
| 2009/0098880 | A1 * | 4/2009 | Lindquist ................. 342/357.07 |
| 2009/0125517 | A1 * | 5/2009 | Krishnaswamy et al. ........ 707/6 |

FOREIGN PATENT DOCUMENTS

| EP | 1710599 A1 | 10/2006 |
| EP | 1808708 A2 | 7/2007 |
| WO | WO2007045002 | 4/2007 |

OTHER PUBLICATIONS

Chuang-Wen You: "Enabling Ebergy-Efficient Localization Services on Sensor Network Positioning Systems" PHD Dissertation, National Taiwan University, [Online] Apr. 25, 2008, XP002576853 Taiwan Retrieved from the Internet.

(Continued)

*Primary Examiner* — Thomas Tarcza
*Assistant Examiner* — Fred H Mull
(74) *Attorney, Agent, or Firm* — Linda G. Gunderson

(57) ABSTRACT

A position location system, apparatus, and method are disclosed. A wireless device includes a satellite positioning system (SPS) receiver and position location processor. The SPS receiver detects the availability of positioning signals and the position location processor determines an initial position of the wireless device based upon the positioning signals. A controller generates power saving events when the positioning signals are detected as being available. The controller determines the timing and duration of the power saving events. During a power saving event, the SPS receiver is deactivated and/or processing of the positioning signals is suspended to reduce power consumption of the wireless device. The initial position is updated based upon relative positioning information from one or more sensors during the power saving event. The controller activates the SPS receiver and resumes processing of the positioning signals following the power saving event.

43 Claims, 7 Drawing Sheets

OTHER PUBLICATIONS

International Search Report and the Written Opinion—PCT/US2009/043328, International Search Authority—European Patent Office—Apr. 16, 2010.

Partial International Search Report—PCT/US2009/043328, International Search Authority—European Patent Office—Jan. 21, 2010.

Quyen Hua: "Availability: What is Availability? Availability of What?" Proceedings of the 1997 National Technical Meeting of the Institute of Navigation, Jan. 16, 1997, pp. 831-838, XP002562960 U.S.A.

* cited by examiner

GPS POWER SAVINGS USING LOW POWER SENSORS

FIELD OF THE DISCLOSURE

This disclosure relates generally to electronic communications and, more particularly, to wireless position location systems.

BACKGROUND OF THE DISCLOSURE

In many applications it is advantageous to have the ability to determine a position of a wireless device. Position location capabilities may be helpful for navigation, tracking, or in the event of an emergency.

Advances in the performance of portable electronics, particularly advances in the performance of processors, have added to the demand for using-position location with a variety of wireless devices.

However, position location functions can consume substantial amounts of power and, in some cases, can significantly reduce the amount of time that a wireless device can be operated on battery power. This is because the same battery typically supplies-power for positioning functions as well as for other functions such as voice and data communications.

Since the position of a wireless device can change over time, it must be updated in order to remain accurate. For example, position may change rapidly when traveling in a car or riding a motorcycle. Infrequent updates may lead to large positioning errors. This can be especially detrimental for navigation or for position location in the event of an emergency.

Therefore, it is desirable to have a position location system, method, and apparatus that can reduce the power consumed for position location functions while maintaining a level of positioning accuracy.

BRIEF SUMMARY OF THE DISCLOSURE

Various embodiments of a position location system, apparatus, and method are disclosed. In one embodiment, a method of reducing power consumption in a mobile device having a satellite positioning system (SPS) receiver is disclosed. The method includes detecting the availability of positioning signals with the SPS receiver and determining a position of the mobile device based upon the positioning signals. The method also includes suspending processing of the positioning signals in response to a power saving event when the positioning signals are detected as being available. The method includes updating the position of the mobile device based upon data from the one or more sensors while processing of the positioning signals is suspended and resuming processing of the positioning signals following the power saving event.

In one embodiment, the method includes determining a quality of the positioning signals such that the positioning signals are treated as being unavailable if the quality does not exceed a predetermined threshold. The method can also include estimating an accuracy of the position determined using the positioning signals and adjusting the frequency and/or duration of the power saving event based upon one or both of these estimates. In some embodiments, the duration of the power saving event is established in accordance with an accuracy of the one or more sensors and may also reflect a time required for the SPS receiver to detect the availability of the positioning signals. The duration of the power saving event can also be determined so that a positioning error of the updated position does not exceed a predetermined value.

In one embodiment, the method includes collecting data from the one or more sensors and determining a position offset based upon the sensor data. The method also includes adjusting the last position of the mobile device using the position offset. In some embodiments, the method includes determining a velocity of the mobile device using the data from the one or more sensors and adjusting the last position of the mobile device based upon the velocity. The sensors can include an accelerometer, gyroscope, and altimeter. In some embodiments, the sensors are micro-electromechanical (MEMS) devices.

In one embodiment, a wireless device is disclosed. The wireless device includes a satellite positioning system (SPS) receiver which detects the availability of one or more positioning signals. The wireless device also includes one or more sensors which generate data used to determine a relative change in the position of the wireless device. A position location processor is coupled to the SPS receiver and to the one or more sensors and determines a current position of the wireless device using the positioning signals. A controller deactivates the SPS receiver when the positioning signals are detected as being available and causes the position location processor to update the position of the wireless device based upon the data from the one or more sensors while the SPS receiver is deactivated. The controller reactivates the SPS receiver and cause the position location processor to determine a current position of the wireless device following a sleep interval.

In one embodiment, a method of reducing power consumption in a wireless device having a satellite positioning system (SPS) receiver is disclosed. The method includes detecting the availability of positioning signals with the SPS receiver and determining a current position of the mobile device based upon the positioning-signals. The method includes estimating an error of the current position and deactivating the SPS receiver if the error of the current position does not exceed a predetermined threshold. While the SPS receiver is deactivated, the current position is adjusted from time to time based upon data from one or more analog sensors to obtain an updated position. The SPS-receiver is activated based upon a cumulative error of the updated position.

In one embodiment, a wireless device is disclosed. The wireless device includes means for detecting the availability of positioning signals with the SPS receiver and means for processing the positioning signals to determine a position of the mobile device. The wireless device includes means for suspending processing of the positioning signals in response to a power saving, event when the positioning signals are detected as being available. The wireless device further includes means for updating the position of the mobile device based upon data from one or more sensors while processing of the positioning signals is suspended and means for resuming processing of the positioning signals following the power saving event.

In one embodiment, a computer-readable medium carrying one or more sequences; of one or more instructions for determining the position of a wireless device is disclosed. The one or more sequences of one or more instructions including instructions which, when executed by one or more processors, cause the one or more processors to perform steps of: detecting the availability of one or more positioning signals and determining a current position of the wireless device based upon the positioning signals. The instructions also cause the one or more processors to perform steps of determining the timing and duration of a power saving event, deactivating an SPS receiver, and suspending processing of the positioning signals in response to the power saving event if the positioning signals are detected as being available and the current position is obtained. The instructions also cause the one or more processors to perform steps of obtaining sensor data representative of a relative change in the position of the wireless device, updating the position of the wireless device from time to time based upon the sensor data during the power saving event, and activating the SPS receiver and resuming processing of the positioning signals after the power saving event.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF THE DISCLOSURE

A position location system, apparatus, and method are disclosed. A wireless device includes a satellite positioning system (SPS) receiver and position location processor. The SPS receiver detects the availability of positioning signals and the position location processor determines an initial position of the wireless device based upon the positioning signals. A controller generates power saving events when the positioning signals are detected as being available. The controller determines the timing and duration of the power saving events. During a power saving event, the SPS receiver is deactivated and/or processing of the positioning signals is suspended to reduce power consumption of the wireless device. The initial position is updated based upon relative positioning information from one or more sensors during the power saving event. The controller activates the SPS receiver and resumes processing of the positioning signals following the power saving event.

Figure 1:
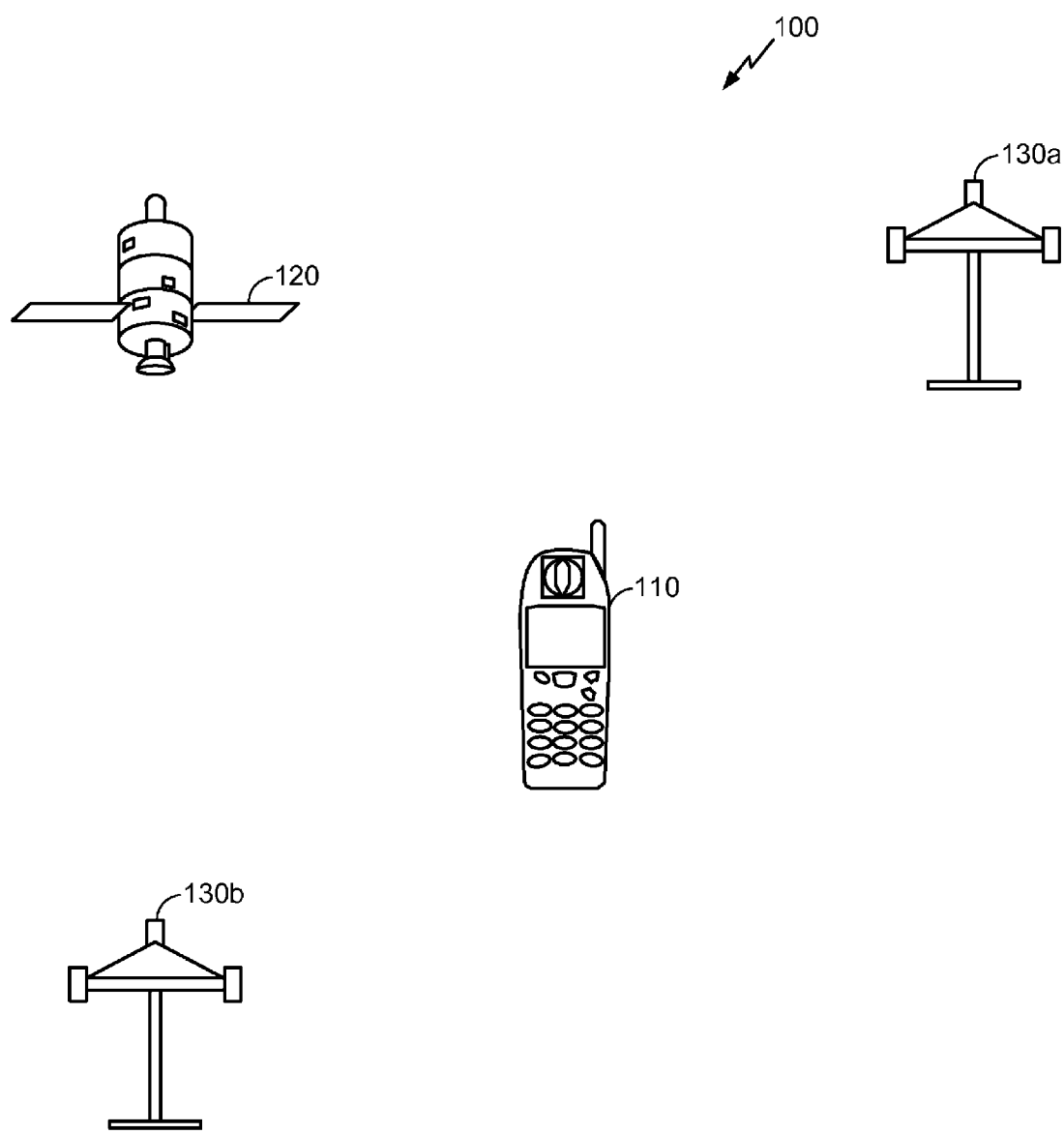
FIG. 1 is a simplified block diagram depicting one embodiment of a position location system.

FIG. 1 is a simplified block diagram depicting one exemplary embodiment of a position location system 100. Positioning or geo-location refers to a process of determining the coordinates of an object on or near the surface of the earth. In position location system 100, mobile station 110 obtains a position fix with assistance from one or more of satellite 120 or base stations 130 and updates its position using relative positioning data from one or more sensors.

Mobile station (MS) 110 is a wireless device having a position location capability. For example, MS 110 can include a cell phone, navigation system, personal computing device, personal digital assistant, asset-tracker, or other wireless communication device. MS 110 can also exchange voice and data signals with other devices using any number or combination of communication standards (e.g., GSM, CDMA, TDMA, WCDMA, OFDM, GPRS, EV-DO, WiFi, WiMAX, 802.xx, UWB, satellite, etc). Power for mobile station 110 is typically supplied by a battery.

Mobile station 110 determines its position in one or more different ways. For example, as shown, mobile station 110 can receive, positioning signals from satellite 120 and can obtain a position by processing information contained in the satellite positioning signals. Satellite 120 can be part of a satellite-positioning system (SPS) such as the Global Positioning System (GPS), Galileo, GLOSNASS, EGNOS, and the like. Using the known position of SPS satellites and the timing of their respective signals, MS 110 can determine its own position.

In addition to satellite-based positioning, MS 110 can also determine its position using terrestrial systems or by using a combination of earth-based and satellite-based positioning. As shown, mobile station 110 communicates with one or more base stations 130. Base stations 130 can, for example, form range estimates using time of arrival (TOA), angle of arrival (AOA), time difference of arrival (TDOA) and related techniques for signals received from MS 110. By combining their known locations with these range estimates, base stations 130 can fix a position for mobile station 110. Base stations 130 can also assist mobile station 110 by locating satellites or performing position location processing using the data obtained by mobile station 110.

Mobile station 110 includes one or more sensors from which it obtains relative positioning data. Sensor data such as velocity and acceleration can be used to determine a position offset. The position offset can be combined with a last known position in order to arrive at an updated position. In some embodiments, mobile station 110 first obtains a position fix and then suspends processing of satellite positioning signals to save power. While processing of positioning signals is suspended, mobile station 110 updates its position locally based upon the sensor data.

Mobile station 110 includes hardware and software elements for making an intelligent determination of how long processing of SPS signals should remain suspended, or if it should be suspended at all, based upon prevailing conditions. Similarly, mobile station 110 can determine how frequently the updated position should be replaced with new information from its satellite or other external positioning system. For example, when operating in autonomous-continuous mode, a conventional GPS-enabled device may update its position once per second. To extend battery life, mobile station 110 may generate power saving events and reduce the frequency of its SPS updates to once every five seconds. During each power saving event, mobile station can, deactivate its SPS receiver and/or position location processing modules and adjust its current position based upon sensor data. In some embodiments, position updates based on sensor data may be performed at the same rate as the suspended SPS updates. In other embodiments, the sensor-data updates may be performed more frequently for improved positioning accuracy. In this way mobile station 110 can effectively reduce its power consumption while maintaining control over positioning.

Figure 2:
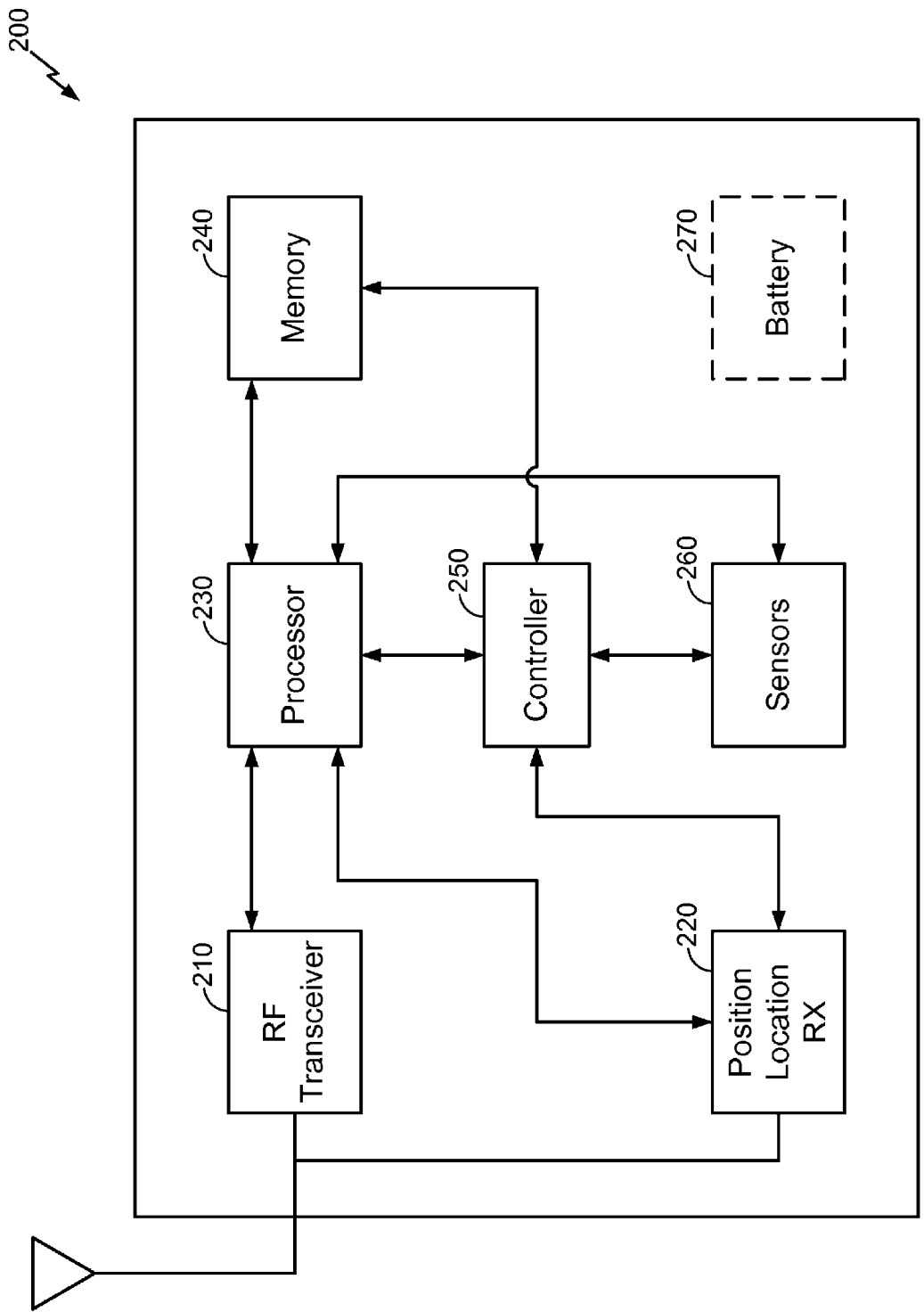
FIG. 2 is a block diagram showing one embodiment of a wireless device such as can be used in a position location system.

FIG. 2 is a block diagram, showing one embodiment of a wireless device 200 such as can be used in position location system 100. In some embodiments, wireless device 200 functions in a manner similar to that described in connection with mobile-station 110. As shown, wireless device 200 includes RF transceiver 210. RF transceiver 210 enables wireless device 200 to exchange voice and data signals with a communication network. On the receive path, it demodulates an incoming signal and provides data to processor 230 whereas on the transmit path it modulates data received from processor 230 and produces an outbound signal. In addition, RF transceiver 210 can also transmit and receive positioning data as in the case of assisted GPS (A-GPS) or other networked-based positioning.

Position location receiver 220 receives positioning signals and provides positioning data to processor 230. For example, in a GPS embodiment, position location receiver 220 may receive navigation frames from one or more GPS satellites. The navigation frames, for example, can include time and date information, ephemeris data, and parts of a satellite almanac. Position location receiver 220 conveys data from the positioning signals to processor 230. Depending upon its operating mode, position location receiver 220 may continuously track the positioning signals or it may acquire positioning data from time to time under the control of processor 230 and/or controller 250.

Processor 230 receives positioning data from position location receiver 220 and possibly from RF transceiver 210. Using the positioning-data, processor 230 fixes the position of wireless device 200 and stores the current position in memory 240. In connection with obtaining a position fix, processor 230 may also determine a quality of the positioning signals and/or an amount of uncertainty in the position measurement and may store this information in memory 240 as well. For example, among other factors, quality and uncertainty may be based upon the signal-to-noise ratio of the positioning signals, the number of satellites visible at a particular point in time, and the accuracy of clock offset estimates based upon the positioning signals.

Figure 8:
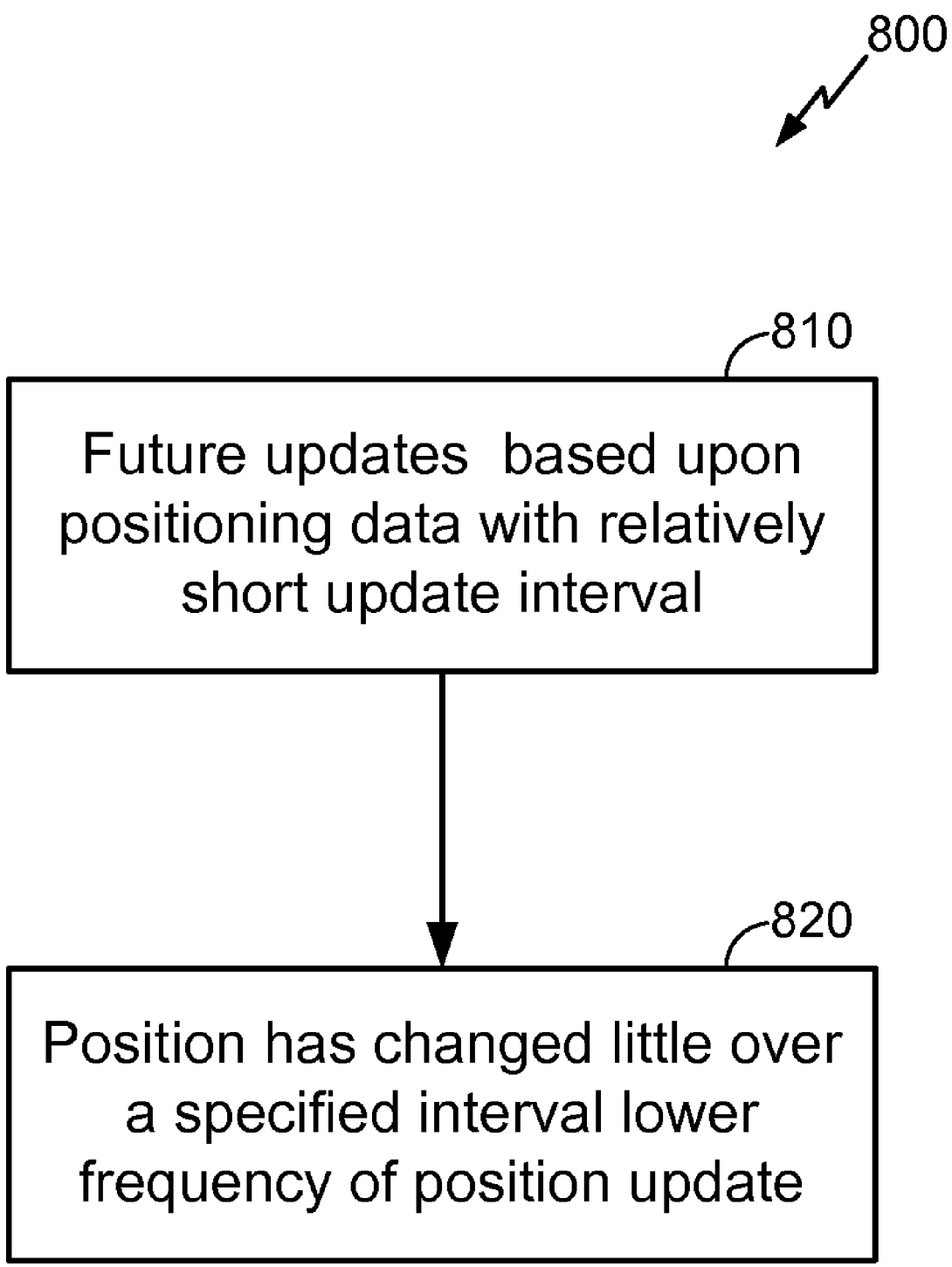
FIG. 8 shows a method of positioning when a power source is an external power source.

Referring to FIG. 2 and FIG. 8, when positioning signal(s) have been detected and wireless device 200 has acquired an initial position fix, processor 230 can make a determination about when and how to update the current position with new data. In some embodiments, wireless device 200 supports a variety of operating modes which govern this determination. For example, FIG. 8 shows a method 800 if wireless device 200 is powered by an external source such as a car battery. At 810, processor 230 may determine that future updates will be based upon positioning data from position location receiver 220 and may set a relatively short update interval. Alternatively, at 820, if wireless device 200 is powered by an external source and its position has changed little over a specified interval (such as might be the case when connected to a wall charger), then processor 230 may update the position of wireless device 200 based upon data from position location receiver 220 although less frequently.

Wireless device 200 also includes battery 270. Although the connections have been omitted for clarity, battery 270 supplies power to some or all of the components of wireless device 200. In particular, battery 270 can supply power to RF transceiver 210, position location receiver 220, processor 230, and controller 250. As a result, when using battery 270, the operating time of wireless device 200 is limited. For example, a typical cellular telephone battery may be rated at approximately 800 mA/H. This means that the battery is capable of carrying an 800 mA load for one hour before it is fully discharged. Position location processing consumes power, adds to the load placed on battery 270, and thus reduces the operating time of wireless device 200.

In some embodiments, processor 230 generates power saving events which signal to controller 250 that some elements of position location processing can be suspended to save power. In response to power savings events, controller 250 may deactivate position location receiver 220 or significantly reduce its power consumption. In addition, controller 250 may also suspend one or more modules used by processor 230 to process positioning data from position location receiver 220. For example, controller 250 may suspend a GPS engine of processor 230 for the duration of the power saving event. Following the power saving event, controller 250 resumes position location processing by activating, position location receiver 220 and enabling the one or more modules of processor 230 as necessary. It will be recognized that processor 230 and controller 250 may be separate elements as shown or that controller 250 (or portions of its logic) may be integrated into processor 230.

During a power saving event, processor 230 updates the position of wireless device 200 based upon data from sensors 260. Sensors 260 provide relative positioning data and can be analog or digital devices. In some embodiments, sensors 260 include an array of individual sensing elements to provide information such as velocity or acceleration which can form the basis for updating the position of wireless device 200. Processor 230 receives the sensor data and processes it as may be required to produce a position offset. Thereafter, a new position of wireless device 200 can be determined by updating its last position stored in memory 240 with the position offset. Alternatively, sensors 260 may determine the position offset directly so that processor 230 can use the offset information with little or no additional processing. In some embodiments, controller 250 receives the sensor data and performs the position update.

Power saving events are discretionary with processor 230 and their frequency and duration are intelligently determined to reduce the demand on battery 270 while maintaining control over positioning functions. Processor 230 thus alternates between a positioning signal available to position location receiver 220 and data from sensors 260 in order to perform position location processing. During a power saving event, the current position of the wireless device may be updated using sensor data at the same rate as updates based upon SPS signals or it may be updated more frequently. In some embodiments, the rate of updates is matched to the sensor hardware so that measurement error is minimized. For example, if measurement error in the sensor data increases with time in a non-linear fashion, the number and frequency of updates during each power saving event may be selected to minimize the total measurement error. This enables processor 230 to maintain a level of positioning accuracy while at the same time conserving power and thereby extending the operating time of wireless device 200.

Figure 3:
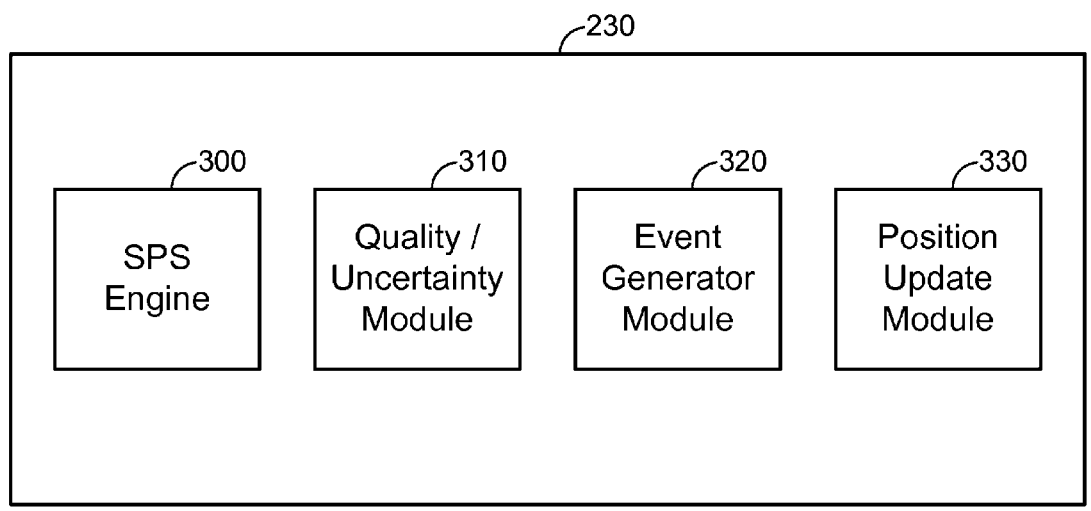
FIG. 3 depicts various functional blocks of one embodiment of a position location processor.

FIG. 3 depicts various functional blocks of one embodiment of a position-location processor such as can be used with wireless device 200 and therefore the following description is provided with continuing reference to FIG. 2. SPS engine 300 controls the operation of a position location receiver and the process for acquiring a position fix. This may include, for example, processing A-GPS information, decoding navigation messages, synchronizing clocks, and calculating a position fix. In some embodiments, the processing performed by SPS engine 300 can be activated and deactivated separately from the other elements of processor 230. For example, SPS engine 300 may be enabled/disabled at the direction of a controller device such as controller 250.

Quality/uncertainty module 310 determines information about the positioning data obtained by SPS engine 300. This information can include a quality of the SPS signal and may reflect an uncertainty in the positioning based upon that signal. For example, quality may be measured at one level by the signal-to-noise ratio of the positioning, signal. At another level, quality may be based upon the number of visible satellites and thus the amount of data available to establish clock and position offsets. In some embodiments, quality may be based upon an estimation algorithm that weighs a number of factors known to affect the accuracy of measurements within the particular SPS.

Event generator 320 is a module responsible for determining the timing and duration of power saving events. In some cases, the timing of power saving events is based upon information from SPS engine 300 and quality/uncertainty module 310. For example, if SPS engine 300 indicates that a positioning signal is not available, event generator 320 may not issue a power saving event until communication with the SPS is possible. In this way, processor 320 judges that both sources of positioning data, SPS positioning signals and data from on-board sensors, are available before generating a power saving event.

In one embodiment, event generator 320 issues power saving events at regular intervals. The power saving events may have the same or different durations. For example, processor 230 may detect that a power level of battery 270 has reached a point where power savings events are desirable for extending the operating time of wireless device 200. After a reliable position fix has been obtained, event generator 320 may begin issuing power saving events. During the power saving events, a control element (such as controller 250) may deactivate a position location receiver and suspend the operation of SPS engine 300 and quality/uncertainty module 310.

Figure 4:
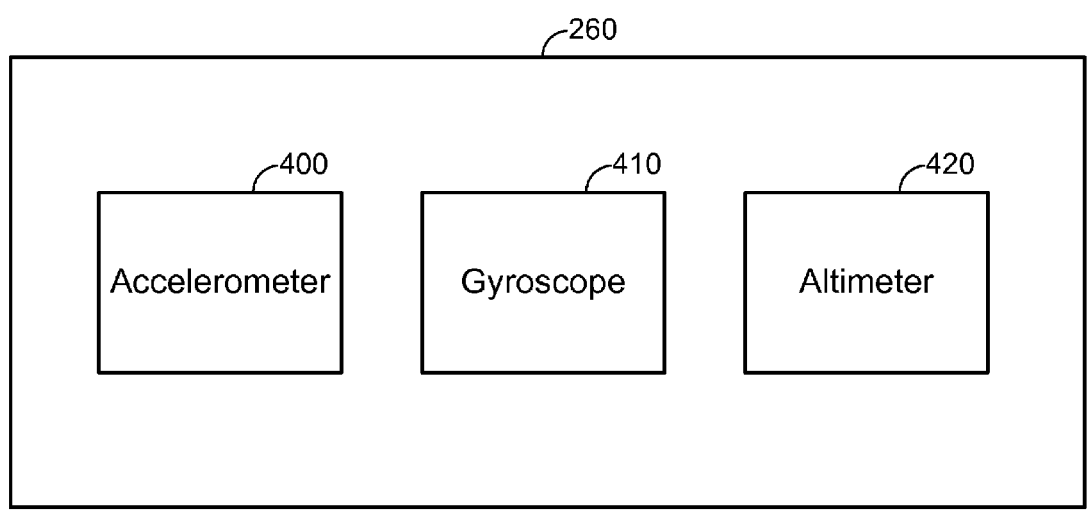
FIG. 4 shows an embodiment of positioning sensors such as can be used to provide inputs to a position location processor.

While these elements are suspended or deactivated, position update module 330 updates the position of wireless device 200 based upon input from sensors 260. With reference to FIG. 4, exemplary sensors 260 which can provide data to position update module 330 are now discussed. In the present embodiment, sensors 260 include an array of microelectromechanical (MEMS) devices for determining a relative position. MEMS sensors 400-420 provide data for processing by position update module 330. Based upon the sensor data, a relative change in the position of wireless device 200 can be determined. Although shown as an array of individual sensor devices, it will be understood that one or more of the sensors can be combined or that additional sensors can be added without departing from the scope of the disclosure. Also, as previously mentioned, sensors 260 may provide individual signals representative of different types of sensor data to processor 230 or the sensor data may be pre-processed such that sensors 260 provide position offset information instead of raw data to, processor 230.

Accelerometer 400 determines the acceleration of wireless device 200 over an operating interval. This may be accomplished by measuring a change in capacitance, using piezoresistive properties, or by other methods. In some cases, the output of accelerometer represents only the magnitude of the acceleration and does not include its direction. Gyroscope 410 supplies a direction of travel. Similarly, altimeter 420 provides signals representative of a change in altitude. For example, sensors 260 may update their values at fixed measurement intervals. After each measurement interval, accelerometer 400 may indicate the magnitude of the acceleration experienced during the measurement interval whereas gyroscope 410 and altimeter 420 may supply directional components. Thus, position update module 330 can integrate the acceleration to determine velocity and use the directional components to form a displacement vector. The last position of wireless device 200 can then be updated with the displacement vector to determine a new position. Thus, the combination of sensors 400-420 permits determining a relative change in position in three-dimensions.

Position update module 330 receives data from sensors 260 and determines a position offset. In the embodiment shown, for example, position-update module 303 may include an integration function for converting data from accelerometer 400 into a velocity vector using additional information from gyroscope 410 and altimeter 420. Once the sensor data has been converted, position update module 330 combines the position offset with the last position of wireless device to determine an updated position. Position update module 330 may repeatedly receive sensor data, determine a position offset, and adjust the last position of wireless device 200 during the power saving-event. In some embodiments, position update module 330 performs its updates at the same rate as SPS position updates while in other embodiments the rate of updates is matched to the properties of sensors 260. In still other embodiments, the rate of updates is determined according to a desired accuracy of the interim positioning. Because sensors 260 typically consume many times less power than the combination of position location receiver 220, SPS engine 300, and quality/uncertainty module 310, battery life is extended while maintaining a positioning capability.

In some embodiments, each power saving event has a predetermined duration. This duration may be based upon several factors including the desired level of positioning accuracy. For example, event generator 320 can determine the duration of the power saving event (also referred to as the "sleep interval") based upon the accuracy of sensors 260 and the time required to acquire a position fix once position, location receiver 220 is reactivated. Assume for example that a positioning accuracy of within 70 meters is desired. Assume further that quality/uncertainty module 310 estimates that the last SPS position fix is accurate to within 30 meters. If, under a worst case scenario, sensors 260 introduce a positioning error of approximately 5 meters per second, then theoretically the sleep interval could last for up to eight seconds. However, if it takes three seconds to acquire a new position fix under prevailing conditions, then the maximum sleep interval is reduced to five seconds. Thus, event generator 320 might issue power saving events each lasting five seconds separated by intervals sufficient to acquire a new fix and to determine its quality/uncertainty.

Event generator 320 can also vary the timing and duration of power saving events based upon several factors. In some embodiments, event generator 320 determines the sleep interval based in part upon a threshold established by quality/uncertainty module 310. Quality/uncertainty module 310 can implement an error estimation algorithm which indicates the accuracy of the position determined using the positioning signals. Event generator 320 can use the result of this algorithm to establish either the frequency at which external positioning data is acquired, the duration of the sleep interval, or both.

For example, at times when the error estimate indicates that accuracy is poor, event generator 320 can increase the frequency at which positioning data is acquired from the satellite or other positioning system. On the other hand, when the error estimate indicates that accuracy is good, the frequency at which positioning data is acquired can be reduced to extend battery life. In a similar manner, event generator 320 can reduce the length of the sleep interval based upon an estimate that accuracy is poor and increase it when accuracy is expected to be good. In one embodiment, event generator 320 averages the error estimate, over a predetermined interval and adjusts the frequency of power saving events or the length of the sleep interval based upon the average error estimate.

Figure 5:
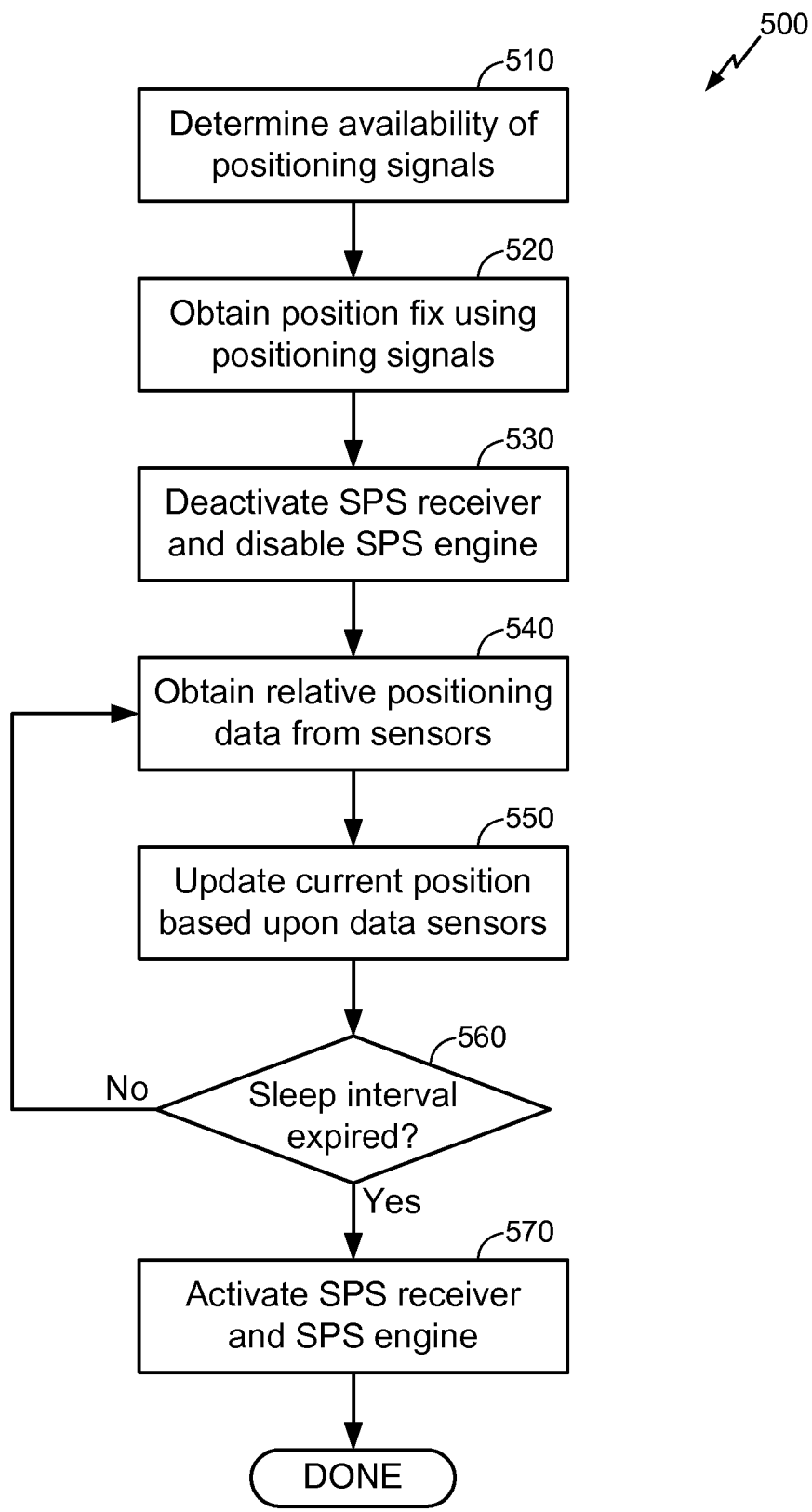
FIG. 5 is a flowchart of processing operations performed according to one embodiment of a position location method.

FIG. 5 is a flowchart of processing operations 500 performed according to one embodiment of a position location method. The method can be performed by a wireless device such as mobile station 110 or wireless device 200.

At block 510, the availability of one or more positioning, signals is determined. For example, in a GPS-enabled device, this can involve receiving navigation messages from one or more satellites and/or positioning signals from cellular base stations, pseudo-lites, or other terrestrial sources. If it is determined that sufficient positioning signals are available, processing continues to block 520.

Next, at block 520, a position fix is obtained based upon the positioning signals. This can involve using data from the positioning signals to determine coordinates for the wireless device in either two-dimensional or three-dimensional space. In one embodiment, an SPS engine combines positioning data from an SPS receiver with information which may be available from non-satellite sources to determine a current position of the wireless device. Continuing with the GPS example, block 520 may be performed by a wireless device operating in autonomous or standalone mode.

At block 530, when a position fix has been obtained, the SPS receiver is deactivated and the SPS engine is disabled for the length of a sleep interval. This may occur, for example, in a response to a power saving event or it may be controlled by a programmable timer. In some embodiments, other elements may also be powered down after the position fix has been obtained to further reduce power consumption. For example, depending upon prevailing, conditions, the RF transmitter may also be deactivated.

At block 540, relative positioning data is obtained from one or more sensors. Sensor data can include signals from one or more low-power MEMS devices such as a gyroscope and accelerometer. In some embodiments, the sensor data conforms to a protocol that enables a position location processor to interpret its meaning. In such cases, the number and type of sensors can vary with the position location processor being responsible for converting the available data into a position offset. Alternatively, the wireless device may include an interface at which a position offset is provided to the position location processor. In other embodiments, the number and type of sensors is fixed.

Next, at block 550, the relative positioning data is used to update the current position of the wireless device. This can involve retrieving a last position from memory and adjusting it based upon the sensor data. In some embodiments, sensor data is filtered before the position update is performed to reduce measurement noise. Decision block 560 determines whether the sleep interval has expired. For example, the sleep interval may have a fixed duration and its end may be signaled by expiration of the programmable timer or by signals from a controller or other processing elements. If the sleep interval has expired, processing continues at block 570. Otherwise, new sensor data is obtained and blocks 540-560 are repeated.

At block 570, the SPS receiver and SPS engine are activated and made ready to acquire a new position of the wireless device. Processing at block 570 can overlap with blocks 540-560 so that position updates continue to be based upon the sensor data until it is determined that all SPS subsystems are operating and positioning signals have been detected. At block 580, the position location method is complete.

Figure 6:
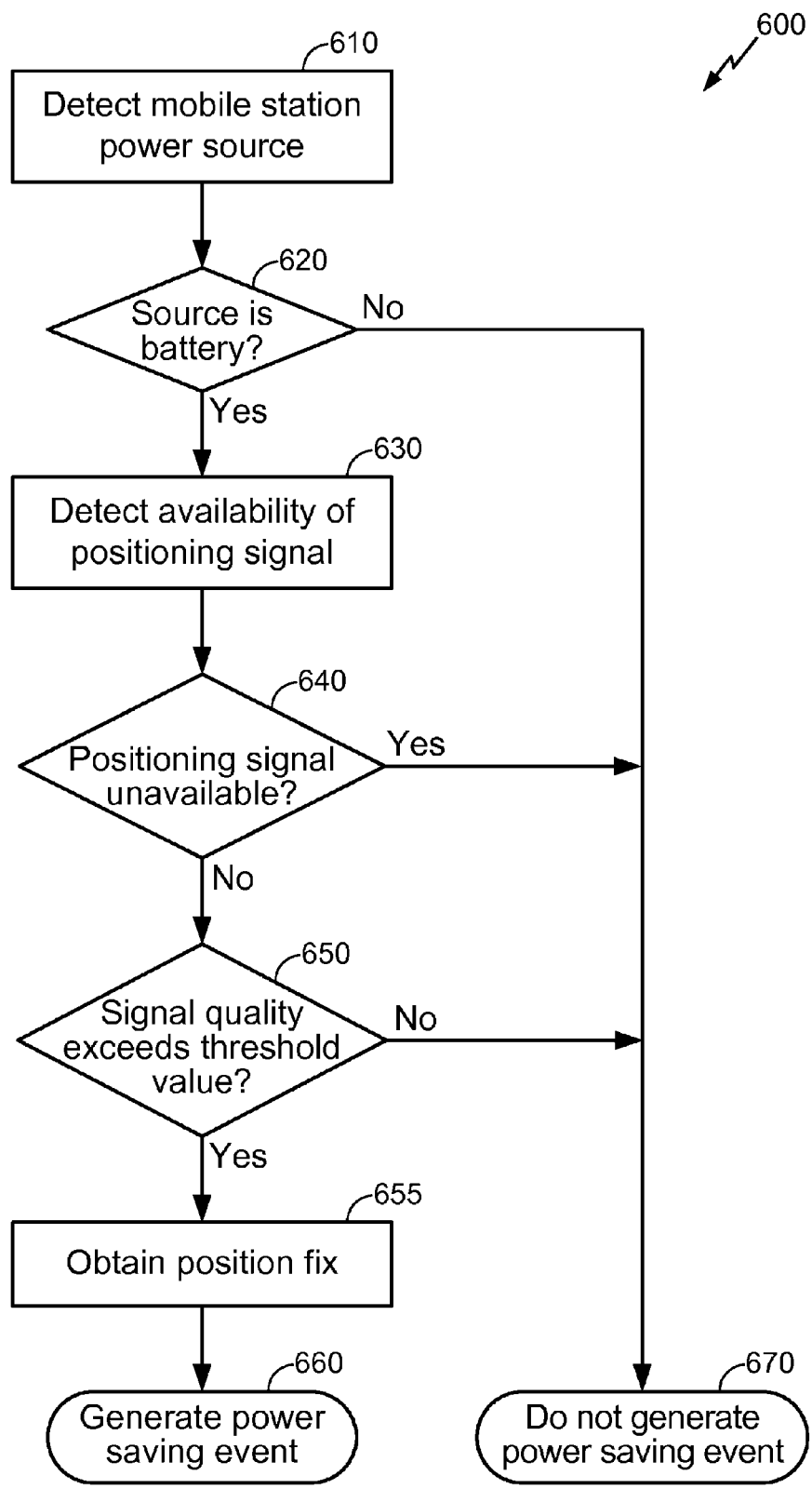
FIG. 6 is a flowchart of processing steps according to an additional embodiment of a position location method.

FIG. 6 is a flowchart of processing 600 performed according to an exemplary position location method. The method can be performed by a wireless device such as mobile station 110 or wireless device 200.

In the presently described method, an initial determination is made at block 610 as to the source of power for the wireless device. In some situations, the wireless device may receive power from a car battery or it may be connected to the electrical grid such that conserving power is not an important consideration. For example, the wireless device may include a current sensor or like hardware to indicate if it is operating from an external power source. If the wireless device is powered by an external source, processing proceeds from decision block 620 to terminal block 670 and no power saving event is generated.

At decision block 620, if it is determined that the wireless device is powered by its battery, processing continues at block 630. At this point, the availability of one or more positioning signals is determined. Positioning signals are used to obtain a position; fix. If sufficient positioning signals are not available, then processing proceeds from decision block 640 to terminal block 670 and no power saving event is generated.

If sufficient positioning signals are detected as being available, then at block 650 a further determination is made as to whether the signal quality exceeds a predetermined threshold. A low signal quality, for example, may indicate difficulty in acquiring positioning data due to environmental conditions or insufficient positioning data for reliable positioning. In such cases, it may be preferable to wait until reliable positioning data is available without attempting to conserve power. Thus, under conditions of poor signal quality, processing proceeds from decision block 650 to terminal block 670 and no power saving event is generated. At block 655, a position fix is obtained and, at block 660, a power saving event is generated when all preceding conditions are satisfied. As noted previously, the power saving event may include deactivating an SPS receiver and one or more modules used to process SPS signals. In some embodiments, functions relating to network-based positioning are also suspended during the power saving event.

Figure 7:
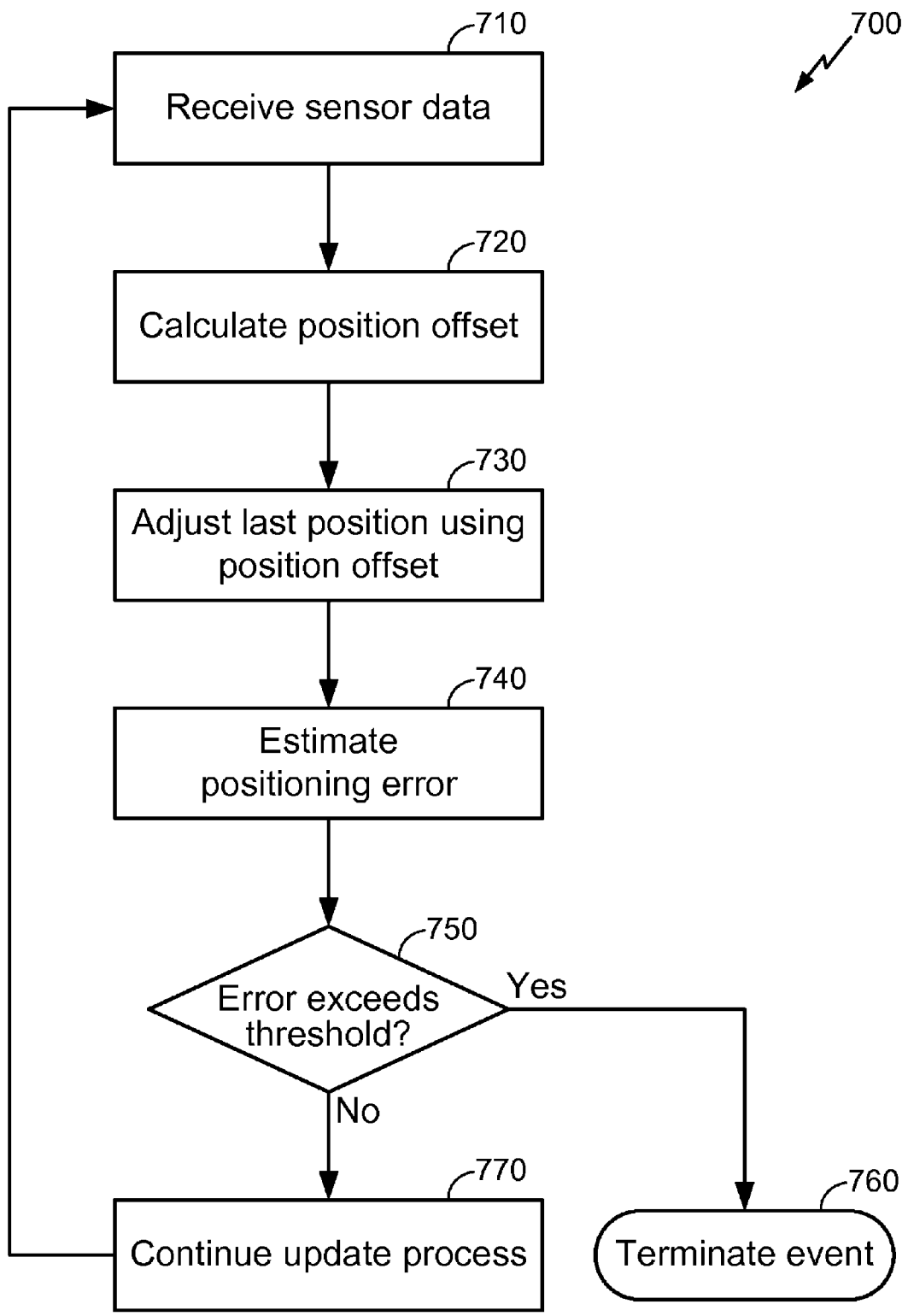
FIG. 7 is a flowchart illustrating additional aspects of position location processing according to an exemplary position location method.

FIG. 7 is a flowchart of position processing 700 according to one embodiment of a position location method. Position processing 700 may be performed by a wireless device such as mobile station 110 or wireless device 200 to update its position during a power saving event and to determine when the power saving event should be terminated.

At block 710, sensor data is received for processing. Sensor data, as discussed herein, provides information about the relative change in position of the wireless device during a particular interval of time. Data may be received from one or more predetermined sensors or it may be received from an arbitrary number of sensors with different capabilities as, for example, can be conveyed through a protocol for exchanging sensor data with a position location processor.

Next, at block 720, a position offset is calculated based upon the sensor data received. In one embodiment, a displacement vector is determined from acceleration data obtained during a measurement interval. For example, the acceleration data can be converted into a velocity and the velocity can be used to offset the last position determined for the wireless device. In such cases, if needed, a gyroscope and altimeter can supply the direction components of velocity. Thus, sensor data is used to produce an offset which reflects the relative change in position of the wireless during the measurement interval. At block 730, the last position of the wireless device is adjusted using the offset calculated at block 720 to produce an updated position.

A cumulative positioning error is tracked during the power saving event. In some embodiments, an error estimate is updated each time the position of the wireless device is adjusted based upon sensor data. For example, initially, the error estimate may be based upon uncertainty in the positioning signals used to obtain the position fix which serves as the basis for positioning updates. Subsequently, it can be revised based upon the positioning accuracy of the sensors such that the error estimate increases with time and each position update reflects the cumulative positioning error.

At block 750, a decision is made as to whether the error estimate exceeds a predetermined threshold. Among other things, the threshold value, may be set based upon a particular application, such as navigation, or to comply with emergency services requirements. Different applications may require different degrees of positioning accuracy which may, in turn, be reflected in their corresponding error thresholds. For example, a positioning error of no more than 30 meters may be needed for navigation purposes whereas accuracy to within 75 meters may suffice for emergency location purposes. Alternatively, a user may set the level of positioning accuracy desired by trading off accuracy in the form of less frequent updates (longer sleep intervals), for prolonged battery life.

Processing proceeds from decision block 750 to terminal block 760 if it is determined that the error threshold has been exceeded. At block 760, the power saving event is terminated and new external positioning data can be obtained. If the error threshold is not exceeded, the update process continues at block 770. As shown, new sensor data is obtained and the method repeats from block 710.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

A software module may reside in RAM memory, flash memory, non-volatile memory, ROM memory, EPROM memory, EEPROM-memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of reducing power consumption in a mobile device having a satellite positioning system (SPS) receiver, the method comprising:

detecting the availability of positioning signals with the SPS receiver;

determining a power source of the mobile device and when the power source is an external power source:

processing the positioning signals to determine a position of the mobile device, the processing comprising:

updating the position of the mobile device at a first frequency when a current position of the mobile device is over a predetermined distance from a previously determined position; and updating the position of the mobile device at a second frequency that is less than the first frequency when the current position of the mobile device is less than the predetermined distance from the previously determined position; and when the power source is a battery included as part of the mobile device:

suspending processing of the positioning signals in response to a power saving event when the positioning signals are detected as being available;

updating the position of the mobile device based upon data from at least one sensor while processing of the positioning signals is suspended; and resuming processing of the positioning signals following the power saving event.

2. The method of claim 1 wherein detecting the availability of the positioning signals further comprises determining a quality of the positioning signals.

3. The method of claim 2 wherein the positioning signals are detected as being unavailable if the quality of the positioning signals does not exceed a predetermined threshold.

4. The method of claim 1 further comprising estimating an accuracy of the position determined using the positioning signals.

5. The method of claim 4 further comprising adjusting a frequency of the power saving event based upon the estimated accuracy of the position.

6. The method of claim 4 further comprising adjusting a duration of the power saving event based upon the estimated accuracy of the position.

7. The method of claim 1 wherein suspending processing of the positioning signals comprises disabling an SPS processing engine of the mobile device and deactivating the SPS receiver for a duration of the power saving event.

8. The method of claim 1 wherein the power saving event occurs at regular intervals.

9. The method of claim 1 wherein a duration of the power saving event is established in accordance with an accuracy of the at least one sensor.

10. The method of claim 1 wherein a duration of the power saving event is determined such that a positioning error of the updated position does not exceed a predetermined value.

11. The method of claim 1, further comprising:

generating the power saving event when the power source is detected as being a battery included as part of the mobile device.

12. The method of claim 1 wherein a duration of the power saving event is based upon an accuracy of the one or more sensors and a time required for the SPS receiver to detect the availability of the positioning signals.

13. The method of claim 1 wherein updating the position of the mobile device further comprises:
collecting data from the at least one sensor;
determining a position offset based upon the sensor data; and
adjusting a last position of the mobile device using the position offset.

14. The method of claim 1 wherein updating the position of the mobile device further comprises:
determining a velocity of the mobile device including a magnitude and direction of travel using the data from the at least one sensor; and
adjusting a last position of the mobile device based upon the velocity.

15. The method of claim 1 further comprising continuing to update the position of the mobile device based upon data from the at least one sensor until the SPS receiver detects the availability of the positioning signals following the power saving event.

16. The method of claim 1 wherein the one or more sensors are selected from the group comprising an accelerometer, gyroscope, and altimeter.

17. The method of claim 1 wherein the one or more sensors comprise micro-electromechanical systems (MEMS) devices.

18. A wireless device, comprising:
a satellite positioning system (SPS) receiver configured to detect an availability of one or more positioning signals;
one or more sensors configured to generate data for determining a relative change in a position of the wireless device and to determine a power source of the wireless device;
a position location processor coupled to the SPS receiver and to the one or more sensors and configured to determine a current position of the wireless device using the positioning signals, the position location processor being further configured to:
respond to the wireless device being powered by an external power source and the positioning signals being available by processing the positioning signals to determine a position of the mobile device, the processing comprising updating the position of the wireless device at a first frequency when a current position of the wireless device is over a predetermined distance from a previously determined position, and updating the position of the wireless device at a second frequency that is less than the first frequency when the current position of the wireless device is less than the predetermined distance from the previously determined position; and
a controller configured to deactivate the SPS receiver when the power source is a battery included as part of the wireless device and the positioning signals are detected as being available and to cause position location processor to update the position of the wireless device based upon the data from the one or more sensors while the SPS receiver is deactivated, the controller being further configured to reactivate the SPS receiver and to cause the position location processor to determine a current position of the wireless device following a sleep interval.

19. The wireless device of claim 18 wherein the controller causes the position location processor to suspend processing of the positioning signals for the duration of the sleep interval.

20. The wireless device of claim 18 wherein the controller periodically deactivates the SPS receiver when the positioning signals are detected as being available.

21. The wireless device of claim 18 wherein the position location processor determines a quality of the positioning signals.

22. The wireless device of claim 21 wherein the positioning signals are detected as being unavailable if the quality does not exceed a predetermined threshold.

23. The wireless device of claim 21 wherein the controller adjusts a length of the sleep interval based upon the quality of the positioning signals.

24. The wireless device of claim 18 wherein the position location processor estimates an accuracy of the position determined using the positioning signals.

25. The wireless device of claim 24 wherein the controller adjusts a length of the sleep interval based upon the estimated accuracy of the position determined using the positioning signals.

26. The wireless device of claim 18 wherein a duration of the sleep interval is based upon an accuracy of the data from the one or more sensors.

27. The wireless device of claim 18 wherein a length of the sleep interval is determined such that a positioning error of the updated position does not exceed a predetermined value.

28. The wireless device of claim 18 further comprising a battery, and wherein the controller deactivates the SPS receiver based upon a power level of the battery.

29. The wireless device of claim 18 wherein a length of the sleep interval is determined according to an accuracy of the one or more sensors and a time required for the SPS receiver to detect the availability of the positioning signals.

30. The wireless device of claim 18 wherein the controller repeatedly causes the position location processor to update the position of the wireless device based upon the data from the at least one sensor during the sleep interval.

31. The wireless device of claim 18 wherein the data from the at least one sensor comprises an acceleration of the wireless device, and wherein the position location processor converts the acceleration into a velocity of the wireless device and uses the velocity to update the position of the wireless device.

32. The wireless device of claim 18 wherein the at least one sensor is selected from the group comprising an accelerometer, gyroscope, and altimeter.

33. The wireless device of claim 18 wherein the at least one sensor comprises a micro-electromechanical systems (MEMS) device.

34. The wireless device of claim 18 further comprising a transmitter and wherein the wireless device transmits the updated position to a communication services provider.

35. A method of reducing power consumption in a wireless device having a satellite positioning system (SPS) receiver, the method comprising:
detecting an availability of positioning signals with the SPS receiver;
determining a power source of the wireless device;
determining a current position of the wireless device based upon the positioning signals, the determining of the current position comprising:
when the power source is an external power source, processing the detected positioning signals by:
updating a position of the mobile device at a first frequency when the current position of the mobile device is over a predetermined distance from a previously determined position; and updating the position of the mobile device at a second frequency that is less than the first frequency when the current position of the mobile device is less than a predetermined distance from the previously determined position; and when the power source is a battery included as part of the mobile device, deactivating the SPS receiver;

while the SPS receiver is deactivated, adjusting the current position based upon data from at least one analog sensor to obtain an updated position; and estimating a cumulative positioning error based upon the updated position; and activating the SPS receiver when the estimated cumulative positioning error of the updated position exceeds a predetermined threshold.

36. The method of claim 35 wherein the cumulative positioning error is based upon an accuracy of the data from the at least one analog sensor and a time that the SPS receiver is deactivated.

37. The method of claim 35 further comprising converting the data from the at least one analog sensor into a position offset, and wherein the updated position is obtained by combining the position offset with a last position of the wireless device.

38. The method of claim 35 further comprising activating and deactivating the SPS receiver at regular intervals so long as the positioning signals are detected as being available and the estimated cumulative positioning error does not exceed the predetermined threshold.

39. A wireless device comprising:

means for determining a power source of the wireless device;

means for detecting an availability of positioning signals with the SPS receiver;

means for processing the positioning signals to determine a position of the wireless device in response to the wireless device being powered by an external power source, comprising:

means for updating the position of the wireless device at a first frequency when a current position of the wireless device is over a predetermined distance from a previously determined position; and means for updating the position of the wireless device at a second frequency that is less than the first frequency when the current position of the wireless device is less than the predetermined distance from the previously determined position; and means for processing the positioning signals to determine a position of the wireless device in response to the wireless device being powered by a battery included as part of the wireless device, comprising:

means for suspending processing of the positioning signals in response to a power saving event when the positioning signals are detected as being available;

means for updating the position of the mobile device based upon data from at least one sensor while processing of the positioning signals is suspended; and means for resuming processing of the positioning signals following the power saving event.

40. The wireless device of claim 39 further comprising means for determining a quality of the positioning signals and wherein the positioning signals are detected as being unavailable if the quality of the positioning signals does not exceed a predetermined threshold.

41. The wireless device of claim 39 further comprising means for determining a duration of the power saving event such that a positioning error of the updated position does not exceed a predetermined value.

42. The wireless device of claim 39 further comprising:

means for collecting data from the at least one sensor;

means for determining a position offset based upon the sensor data; and means for adjusting the last position of the mobile device using the position offset.

43. A computer-readable storage medium carrying one or more sequences of one or more instructions for determining the position of a wireless device, the one or more sequences of one or more instructions including instructions which, when executed by one or more processors, cause the one or more processors to perform steps of:

detecting an availability of one or more positioning signals;

determining a power source of the wireless device;

responding to the wireless device being powered by an external power source by determining a current position of the wireless device based upon the positioning signals by:

updating the position of the mobile device at a first frequency when a current position of the mobile device is over a predetermined distance from a previously determined position; and updating the position of the mobile device at a second frequency that is less than the first frequency when the current position of the mobile device is less than the predetermined distance from the previously determined position; and responding to the wireless device being powered by a battery included as part of the wireless device by:

determining a timing and duration of a power saving event;

deactivating an SPS receiver and suspending processing of the positioning signals in response to the power saving event if the positioning signals are detected as being available and the current position is obtained;

obtaining sensor data representative of a relative change in the position of the wireless device;

updating the position of the wireless device based upon the sensor data during the power saving event; and activating the SPS receiver and resuming processing of the positioning signals after the power saving event.

* * * * *